(12) United States Patent
Ju et al.

(10) Patent No.: US 11,302,985 B2
(45) Date of Patent: Apr. 12, 2022

(54) BATTERY MODULE

(71) Applicant: LG CHEM, LTD., Seoul (KR)

(72) Inventors: Yong Kyu Ju, Daejeon (KR); Jong Ryeol Oh, Daejeon (KR); Jun Hyurk Jeong, Daejeon (KR); Jin Sol Lim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 67 days.

(21) Appl. No.: 16/766,012

(22) PCT Filed: Nov. 15, 2019

(86) PCT No.: PCT/KR2019/015614
§ 371 (c)(1),
(2) Date: May 21, 2020

(87) PCT Pub. No.: WO2020/105967
PCT Pub. Date: May 28, 2020

(65) Prior Publication Data
US 2021/0249724 A1 Aug. 12, 2021

(30) Foreign Application Priority Data
Nov. 19, 2018 (KR) .................. 10-2018-0142758

(51) Int. Cl.
H01M 50/209 (2021.01)
H01M 50/579 (2021.01)
H01M 50/24 (2021.01)
H01M 50/291 (2021.01)
(Continued)

(52) U.S. Cl.
CPC ....... *H01M 50/209* (2021.01); *H01M 50/211* (2021.01); *H01M 50/24* (2021.01); *H01M 50/291* (2021.01); *H01M 50/293* (2021.01); *H01M 50/579* (2021.01)

(58) Field of Classification Search
None
See application file for complete search history.

(56) References Cited

U.S. PATENT DOCUMENTS

| 9,806,306 B2 * | 10/2017 | Tsutsui ................ H01M 50/20 |
| 9,929,386 B2 | 3/2018 | Yoshitake et al. |
| 10,236,482 B2 | 3/2019 | Lee et al. |

(Continued)

FOREIGN PATENT DOCUMENTS

| CN | 203312386 U * | 11/2013 |
| CN | 103931019 A | 7/2014 |

(Continued)

OTHER PUBLICATIONS

Extended European Search Report for European Application No. 19886148.6, dated Jan. 15, 2021.

*Primary Examiner* — Gregg Cantelmo
(74) *Attorney, Agent, or Firm* — Birch, Stewart, Kolasch & Birch, LLP

(57) ABSTRACT

A battery module includes a battery cell assembly constituted by stacking a plurality of battery cells, an end plate disposed adjacent to one end of the battery cell assembly, and a shock-absorbing member interposed between the one end of the battery cell assembly and the end plate, wherein the shock-absorbing member is woven fabric or non-woven fabric formed of a plurality of fibers.

13 Claims, 5 Drawing Sheets

(51) Int. Cl.
*H01M 50/211* (2021.01)
*H01M 50/293* (2021.01)

(56) References Cited

U.S. PATENT DOCUMENTS

| | | | |
|---|---|---|---|
| 10,283,807 B2 | 5/2019 | Busacca et al. | |
| 10,347,885 B2 | 7/2019 | Yoon | |
| 2008/0235855 A1 | 10/2008 | Kobren et al. | |
| 2011/0059353 A1 | 3/2011 | Gutsch et al. | |
| 2012/0052359 A1 | 3/2012 | Yoshitake et al. | |
| 2012/0234613 A1 | 9/2012 | Miyatake | |
| 2012/0282496 A1 | 11/2012 | Schaefer | |
| 2014/0242429 A1 | 8/2014 | Lee et al. | |
| 2015/0188103 A1 | 7/2015 | Minami et al. | |
| 2015/0207115 A1* | 7/2015 | Wondraczek | H01M 50/20 429/99 |
| 2016/0260946 A1 | 9/2016 | Ochi et al. | |
| 2017/0054124 A1 | 2/2017 | Yoon | |
| 2018/0040932 A1 | 2/2018 | Lee et al. | |
| 2018/0047970 A1 | 2/2018 | Lee | |
| 2018/0145367 A1 | 5/2018 | Busacca et al. | |
| 2018/0229621 A1 | 8/2018 | Roh et al. | |
| 2018/0366698 A1 | 12/2018 | An et al. | |
| 2019/0221878 A1 | 7/2019 | Busacca et al. | |

FOREIGN PATENT DOCUMENTS

| | | |
|---|---|---|
| CN | 106898714 A | 6/2017 |
| CN | 107925032 A | 4/2018 |
| EP | 3 373 361 A1 | 9/2018 |
| GB | 2062944 A | 5/1981 |
| JP | 11-79252 A | 3/1999 |
| JP | 2008-53072 A | 3/2008 |
| JP | 2010-244894 A | 10/2010 |
| JP | 2011-131707 A | 7/2011 |
| JP | 5173167 B2 | 3/2013 |
| JP | 5229303 B2 | 7/2013 |
| JP | 2014-150039 A | 8/2014 |
| JP | 2015-125859 A | 7/2015 |
| JP | 5791578 B2 | 10/2015 |
| JP | 2016-9555 A | 1/2016 |
| JP | 2017-103158 A | 6/2017 |
| JP | 2017-162703 A | 9/2017 |
| JP | 2018-49823 A | 3/2018 |
| KR | 10-2006-0102661 A | 9/2006 |
| KR | 10-2012-0022922 A | 3/2012 |
| KR | 10-2013-0086677 A | 8/2013 |
| KR | 10-2014-0147555 A | 12/2014 |
| KR | 10-2017-0022783 A | 3/2017 |
| KR | 10-2017-0027498 A | 3/2017 |
| KR | 10-2017-0142212 A | 12/2017 |
| WO | WO 2015/145927 A1 | 10/2015 |

* cited by examiner

【FIG. 1】
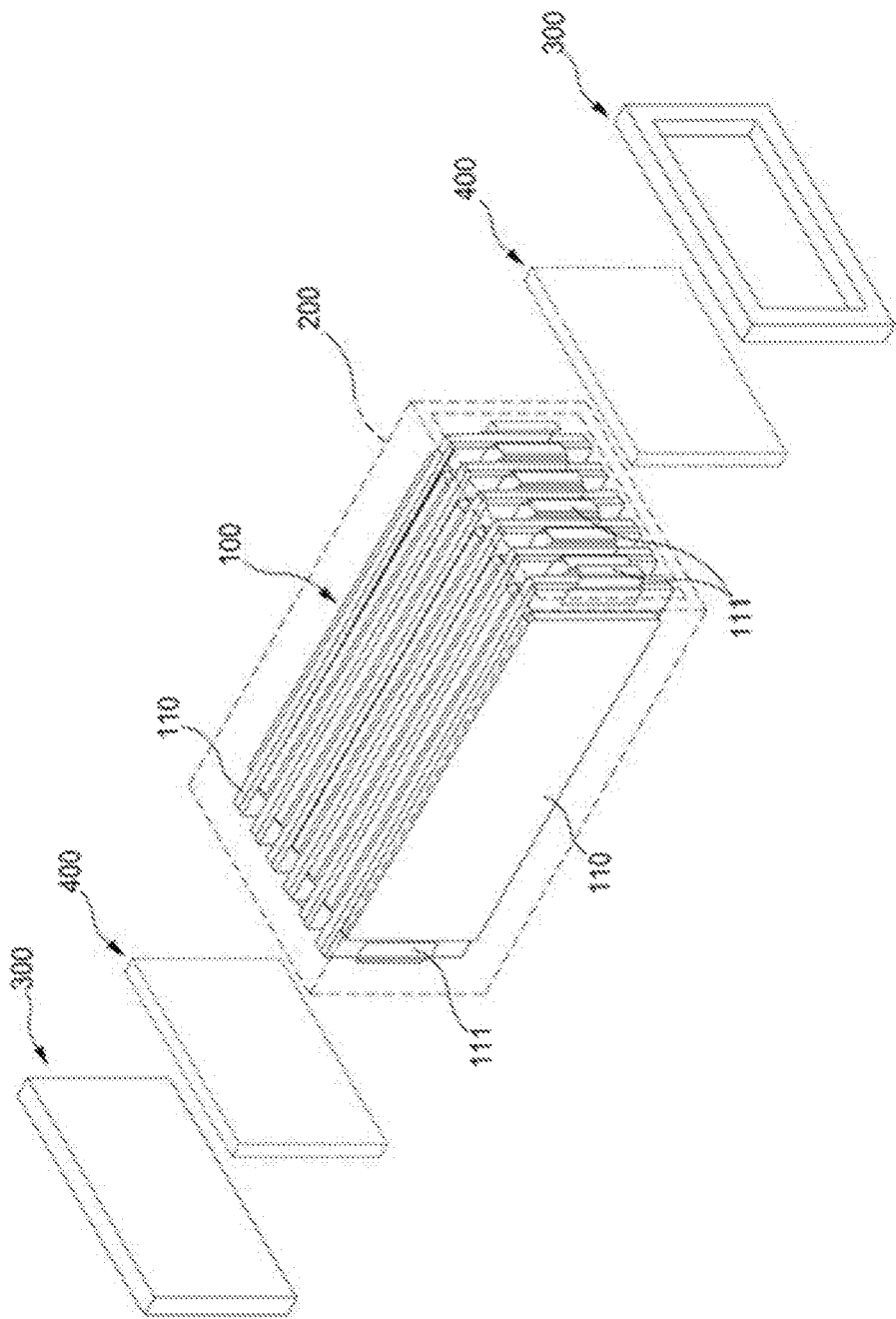

[FIG. 2]
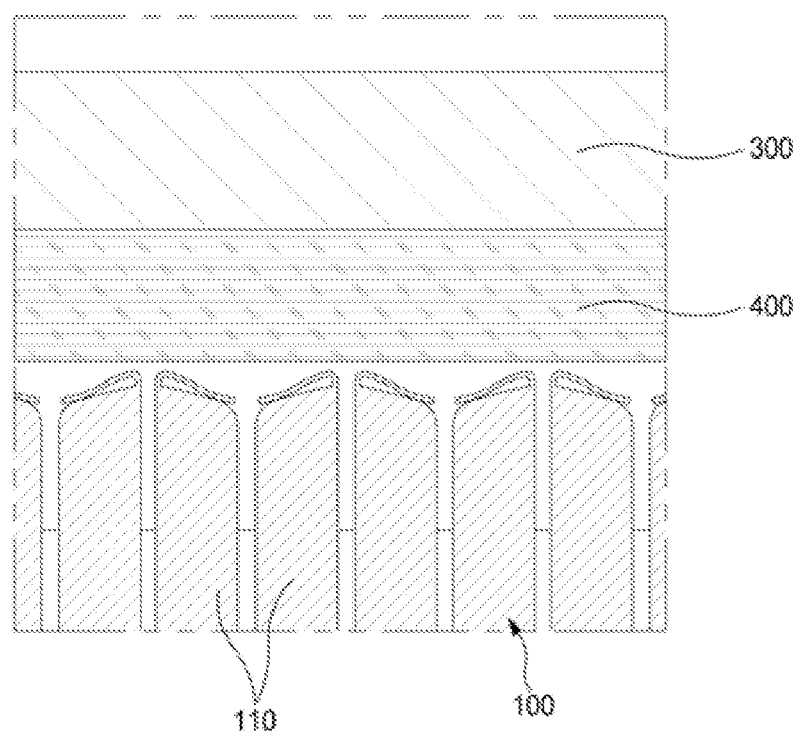

[FIG. 3]
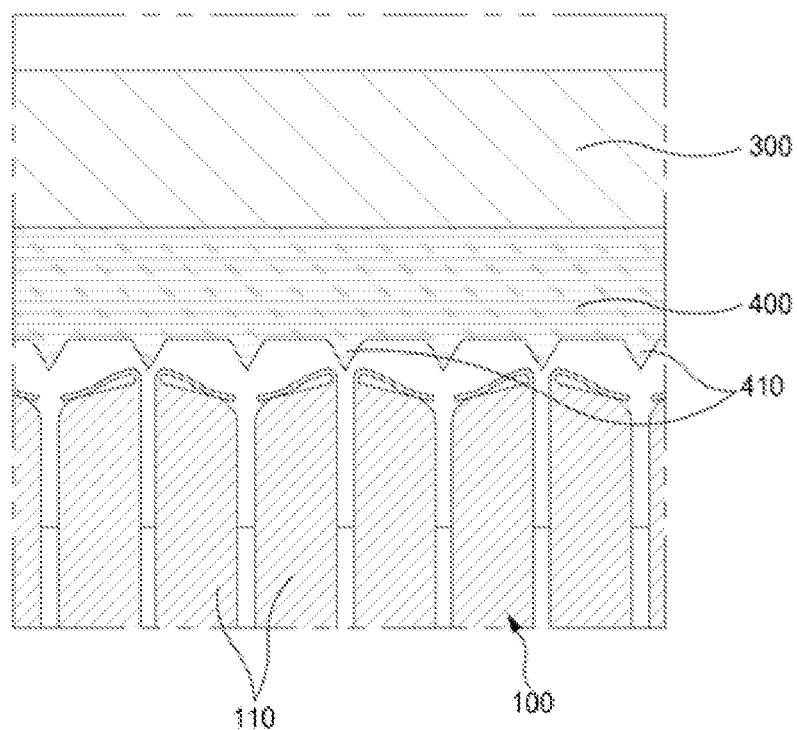

[FIG. 4]
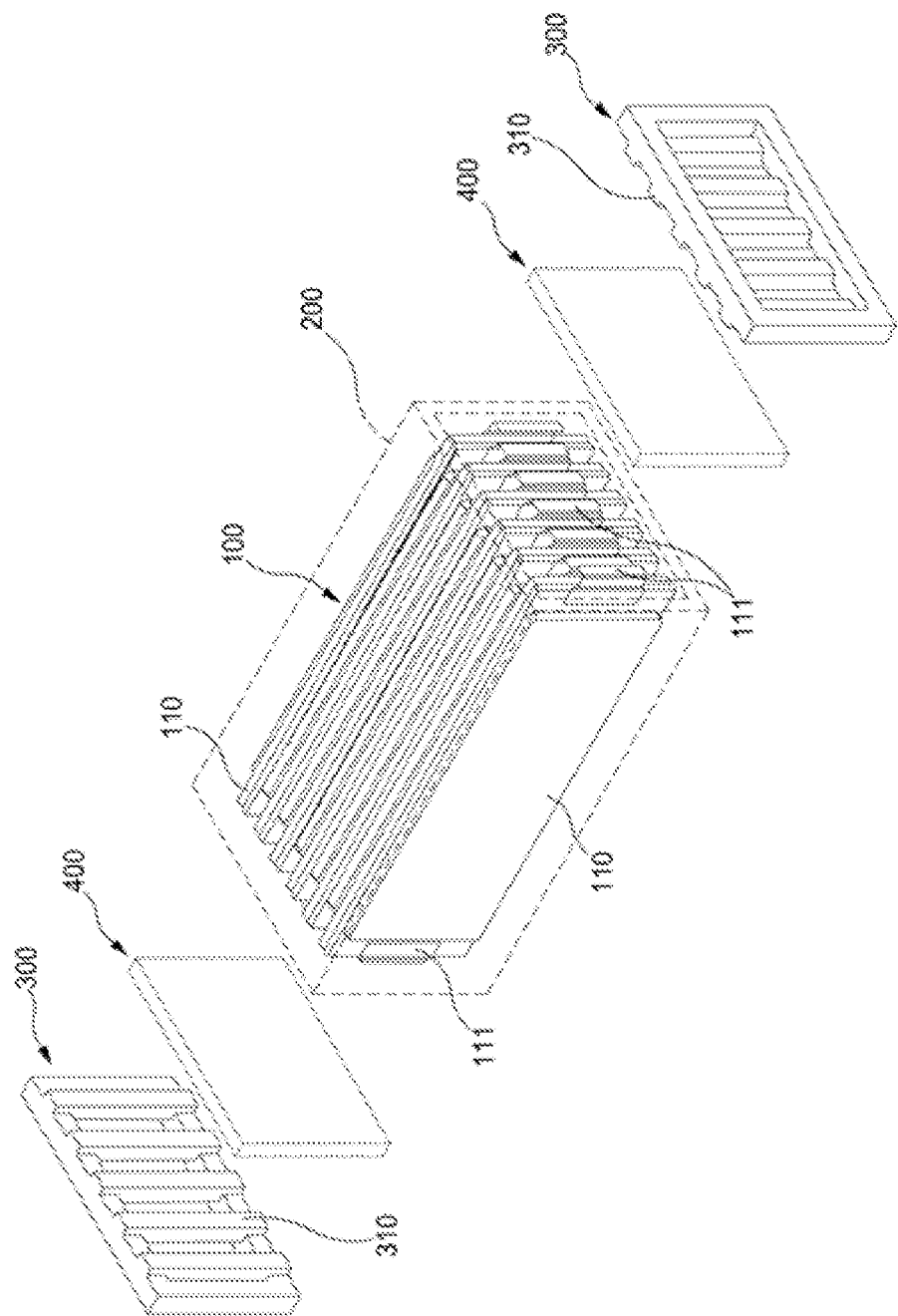

【FIG. 5】
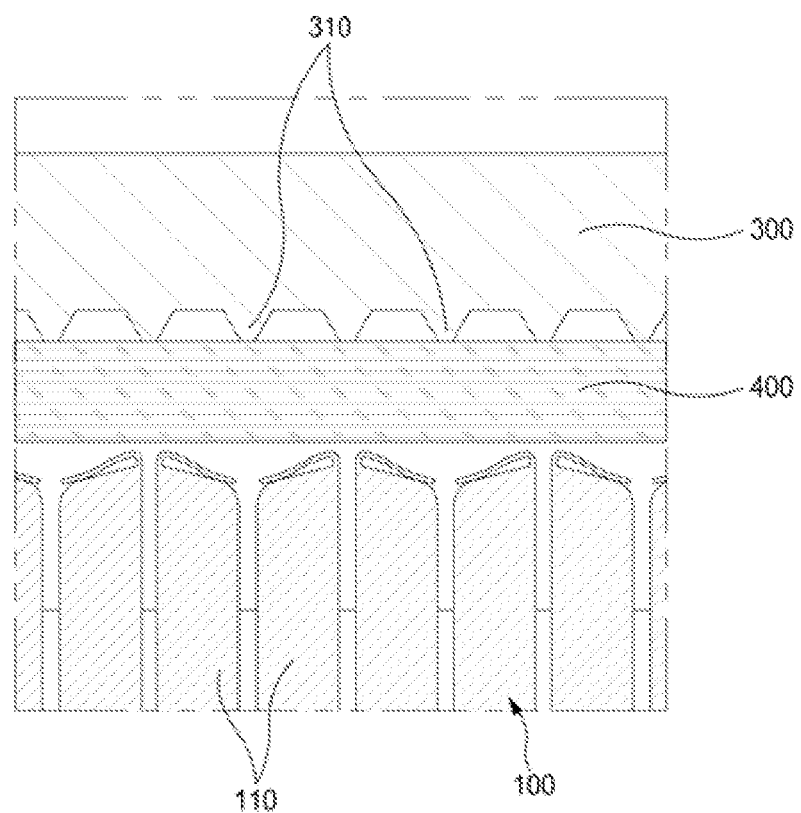

BATTERY MODULE

TECHNICAL FIELD

This application claims the benefit of priority to Korean Patent Application No. 2018-0142758 filed on Nov. 19, 2018, the disclosure of which is hereby incorporated by reference herein its entirety.

The present invention relates to a battery module.

BACKGROUND ART

In recent years, with an increase in the demand for portable electronic devices, such as laptop computers, smartphones, and tablet computers, research has been actively conducted on high-performance secondary batteries that are capable of being repeatedly charged and discharged.

In addition, secondary batteries have come to be widely used in medium- or large-sized devices, such as vehicles, robots, and satellites, as well as small-sized devices, such as portable electronic devices. In particular, as fossil fuels are being depleted and increasing attention is being paid to environmental pollution, research on hybrid vehicles and electric vehicles is being actively conducted. The most essential part of a hybrid vehicle or an electric vehicle is a battery pack configured to supply electric power to a motor.

The hybrid vehicle or the electric vehicle has advantages in that fuel efficiency is high and pollutants are not discharged or the amount thereof can be reduced, compared to a vehicle using only an internal combustion engine, since it is possible to obtain driving force from the battery pack. The battery pack used in the hybrid vehicle or the electric vehicle includes a battery module including a plurality of battery cells, and the plurality of battery cells is connected to each other in series and/or in parallel, whereby the capacity and output of the battery module are increased.

Since the plurality of battery cells is provided in the battery module in the state of being close thereto, it is necessary to secure safety of the battery module against external impact. In the case in which physical impact is applied to the battery cells due to various causes, such as dropping of the battery module, the battery cells may be damaged and an electrolytic solution in each of the battery cells may be discharged outside. Also, in the case in which the plurality of battery cells is damaged by physical impact, external short circuit may occur between the plurality of battery cells, whereby the battery module may catch fire or explode.

Therefore, there is a need to provide a construction capable of preventing the occurrence of external short circuit between the plurality of battery cells even in the case in which impact is applied to the battery module.

DISCLOSURE

Technical Problem

The present invention has been made in view of the above problems, and it is an object of the present invention to provide a battery module configured to be capable of preventing the occurrence of external short circuit between a plurality of battery cells even in the case in which physical impact is applied to the battery module.

Technical Solution

A battery module according to an embodiment of the present invention provided to accomplish the above object may include a battery cell assembly constituted by stacking a plurality of battery cells, an end plate disposed adjacent to one end of the battery cell assembly, and a shock-absorbing member interposed between the one end of the battery cell assembly and the end plate, wherein the shock-absorbing member may be woven fabric or non-woven fabric formed of a plurality of fibers.

Each of the fibers may be an aramid-based electrically insulative fiber.

The shock-absorbing member may have a plurality of projecting portions projecting toward the plurality of battery cells.

Each of the plurality of projecting portions may be formed such that the width of each of the plurality of projecting portion gradually decreases toward the plurality of battery cells.

Each of the plurality of projecting portions may be provided with a tip having an acute angle toward the plurality of battery cells.

A protrusion protruding toward the plurality of battery cells may be provided on the surface of the end plate facing the shock-absorbing member.

The protrusion may be formed such that the width of the protrusion gradually decreases toward the plurality of battery cells.

The battery module according to the embodiment of the present invention may further include a frame configured to receive the battery cell assembly so as to wrap the battery cell assembly, wherein the end plate may be fixed to the frame.

At least one projecting portion on the shock-absorbing member may extend toward the plurality of battery cells, the plurality of battery cells are stacked in a first direction, the at least one projecting portion may extend in a second direction perpendicular to the first direction, and the at least one projecting portion may be aligned to be between battery cells of the plurality of battery cells.

The at least one projecting portion may be a plurality of protrusions, each of the plurality of projecting portions may be aligned to be between two battery cells of the plurality of battery cells, and a space between each of the plurality of projecting portions may be equal to a width of each of the plurality of battery cells.

At least one protrusion on the end plate may extend toward the plurality of battery cells, the plurality of battery cells are stacked in a first direction, the at least one protrusion may extend in a second direction perpendicular to the first direction, and the at least one protrusion may be aligned to be between battery cells of the plurality of battery cells.

A space between each of the plurality of projecting portions may be equal to a width of each of the plurality of battery cells.

DESCRIPTION OF DRAWINGS

FIG. 1 is an exploded perspective view schematically showing a battery module according to a first embodiment of the present invention.

FIG. 2 is a sectional view schematically showing a portion of the battery module according to the first embodiment of the present invention.

FIG. 3 is a sectional view schematically showing a portion of a battery module according to a second embodiment of the present invention.

FIG. 4 is an exploded perspective view schematically showing a battery module according to a third embodiment of the present invention.

FIG. 5 is a sectional view schematically showing a portion of the battery module according to the third embodiment of the present invention.

BEST MODE

Hereinafter, battery modules according to embodiments of the present invention will be described in detail with reference to the accompanying drawings.

As shown in FIGS. 1 and 2, a battery module according to a first embodiment of the present invention may include a battery cell assembly 100 constituted by stacking a plurality of battery cells 110, a frame 200 configured to receive the battery cell assembly 100 so as to wrap the battery cell assembly, end plates 300 disposed adjacent to opposite ends of the battery cell assembly 100, and a shock-absorbing member 400 interposed between each of the opposite ends of the battery cell assembly 100 and a corresponding one of the end plates 300.

For example, each of the battery cells 110 may be a pouch-shaped battery cell. In this case, the battery cell 110 may have an electrode assembly and a pouch configured to receive the electrode assembly. The electrode assembly may be constituted by assembling a plurality of electrode plates (positive electrode plates and negative electrode plates) and a plurality of separators. Each electrode plate of the electrode assembly is provided with an electrode tab, and a plurality of electrode tabs may be connected to an electrode lead 111. The electrode lead 111 is exposed outwards from the pouch, and the exposed portion of the electrode lead 111 may serve as an electrode terminal of the battery cell 110.

The electrode lead 111 may include a positive electrode lead and a negative electrode lead. The electrode leads 111 of the plurality of battery cells 110 may be connected to each other in parallel or in series by welding. As a result, the plurality of battery cells 110 may be electrically connected to each other.

For example, a plurality of positive electrode leads may protrude forwards from the battery cell assembly 100, and a plurality of negative electrode leads may protrude rearwards from the battery cell assembly 100. In this case, there is no interference between the positive electrode leads and the negative electrode leads. As another example, both the positive electrode leads and the negative electrode leads may protrude forwards or rearwards from the battery cell assembly 100.

The frame 200 receives the plurality of battery cells 110 in a space defined therein. The frame 200 serves to protect the outer edges of the plurality of battery cells 110 from the outside. The frame 200 is configured to support the plurality of battery cells 110 such that the plurality of battery cells does not move. Openings are formed in opposite sides of the frame 200 such that opposite ends of the battery cell assembly 100 are exposed outwards through the openings of the frame 200.

The end plates 300 may be coupled to the frame 200 using various methods, such as bolting, welding, and riveting. The end plates 300 may be coupled to the frame 200 so as to block the openings of the frame 200. The end plates 300 may serve to support opposite ends of the battery cell assembly 100 and to prevent the outer shape of the battery module from being changed by swelling of the battery cell assembly 100. Each of the end plates 300 may be made of a high-rigidity metal.

In the case in which physical impact is applied to the battery module and the end plates 300 are deformed, the shock-absorbing members 400 serve to absorb some of the deformation of the end plates 300. In addition, when the end plates 300 are deformed, the shock-absorbing members 400 serve to penetrate between the plurality of battery cells 110 in order to isolate the plurality of battery cells 110 from each other. Even in the case in which physical impact is applied to the battery module and the end plates 300 are deformed, therefore, it is possible to prevent the occurrence of external short circuit between the plurality of battery cells 110.

Each of the shock-absorbing members 400 may be woven fabric or non-woven fabric formed of a plurality of fibers. When the end plates 300 are deformed, therefore, the plurality of fibers of the shock-absorbing members 400 may penetrate between the plurality of battery cells 110. Since each of the shock-absorbing members 400 is formed of a plurality of fibers, the shock-absorbing member 400 may exhibit predetermined flexibility. As a result, the shock-absorbing members 400 may easily penetrate between the plurality of battery cells 110.

Here, each of the fibers constituting the shock-absorbing members 400 is preferably an aramid-based electrically insulative fiber (a bulletproof material). Since each of the fibers constituting the shock-absorbing members 400 is an electrically insulative fiber, the plurality of fibers of the shock-absorbing members 400 may penetrate between the plurality of battery cells 110 to isolate the plurality of battery cells 110 from each other when the end plates 300 are deformed. In addition, the plurality of fibers of the shock-absorbing members may prevent the occurrence of external short circuit between the plurality of battery cells 110 and an external conductor. In addition, since each of the fibers constituting the shock-absorbing members 400 is an aramid-based fiber, it is possible to minimize deformation of the plurality of battery cells 110.

In the battery module according to the first embodiment of the present invention, the shock-absorbing members 400, each of which is formed of a plurality of fibers, are inserted between the battery cell assembly 100 and the end plates 300. Consequently, in the case in which external force is applied to the end plates 300 and the end plates 300 are deformed due to dropping of the battery module and the like, the plurality of fibers constituting the shock-absorbing members 400 may penetrate between the plurality of battery cells 110. Even in the case in which the end plates 300 are deformed by external impact, therefore, it is possible to prevent the occurrence of external short circuit between the plurality of battery cells 110 and external short circuit between the battery cells 110 and a conductor adjacent thereto, and it is possible to minimize deformation of the plurality of battery cells 110.

Hereinafter, a battery module according to a second embodiment of the present invention will be described with reference to FIG. 3. Components identical to the components of the first embodiment of the present invention are denoted by the same reference numerals, and a detailed description thereof will be omitted.

As shown in FIG. 3, the battery module according to the second embodiment of the present invention may be configured such that a shock-absorbing member 400 has projecting portions 410 projecting toward between a plurality of battery cells 110. Each of the projecting portions 410 may have a wedge shape, the width of which gradually decreases toward between corresponding ones of the plurality of battery cells 110. The projecting portion 410 may be provided with a sharp tip having an acute angle.

In the battery module according to the second embodiment of the present invention, the shock-absorbing member 400 has projecting portions 410 projecting toward between the plurality of battery cells 110. In the case in which an end plate 300 is deformed by external impact, therefore, the wedge-shaped projecting portions 410 of the shock-absorbing member 400 may penetrate between the plurality of battery cells 110, whereby a plurality of fibers constituting the shock-absorbing member 400 may more easily penetrate between the plurality of battery cells 110.

Hereinafter, a battery module according to a third embodiment of the present invention will be described with reference to FIGS. 4 and 5. Components identical to the components of the first and second embodiments of the present invention are denoted by the same reference numerals, and a detailed description thereof will be omitted.

As shown in FIGS. 4 and 5, the battery module according to the third embodiment of the present invention may be configured such that protrusions 310 protruding toward between a plurality of battery cells 110 are provided on the surface of an end plate 300 opposite a shock-absorbing member 400. Each of the protrusions 310 may have a wedge shape, the width of which gradually decreases toward between corresponding ones of the plurality of battery cells 110.

In the battery module according to the third embodiment of the present invention, the protrusions 310 protruding toward between the plurality of battery cells 110 are provided on the surface of the end plate 300 disposed opposite the shock-absorbing member 400. In the case in which the end plate 300 is deformed by external impact, therefore, the shock-absorbing member 400 is pushed by the protrusions 310, whereby the shock-absorbing member 400 may more easily penetrate between the plurality of battery cells 110.

The preferred embodiments of the present invention have been described illustratively; however, the scope of the present invention is not limited to such specific embodiments, and may be appropriately changed within the category described in the claims.

DESCRIPTION OF REFERENCE NUMERALS

100: Battery cell assembly
110: Battery cells
200: Frame
300: End plates
310: Protrusions
400: Shock-absorbing members
410: Projecting portions

INDUSTRIAL APPLICABILITY

In a battery module according to an embodiment of the present invention, a shock-absorbing member formed of a plurality of fibers is inserted between a battery cell assembly and an end plate. Consequently, in the case in which external force is applied to the end plate and the end plate is deformed due to dropping of the battery module and the like, the plurality of fibers constituting the shock-absorbing member penetrates between a plurality of battery cells. Even in the case in which the end plate is deformed by external impact, therefore, it is possible to prevent the occurrence of external short circuit between the plurality of battery cells and external short circuit between the battery cells and a conductor adjacent thereto, and it is possible to minimize deformation of the plurality of battery cells.

The invention claimed is:

1. A battery module comprising:
a battery cell assembly constituted by stacking a plurality of battery cells;
an end plate disposed adjacent to one end of the battery cell assembly; and
a shock-absorbing member interposed between the one end of the battery cell assembly and the end plate,
wherein the shock-absorbing member is woven fabric or non-woven fabric formed of a plurality of fibers, and
wherein the shock-absorbing member has a plurality of projecting portions projecting toward the plurality of battery cells.

2. The battery module according to claim 1, wherein each of the fibers is an aramid-based electrically insulative fiber.

3. The battery module according to claim 1, wherein the plurality of projecting portions are formed such that a width of each of the plurality of projecting portion gradually decreases toward the plurality of battery cells.

4. The battery module according to claim 1, wherein each of the plurality of projecting portions is provided with a tip having an acute angle toward the plurality of battery cells.

5. The battery module according to claim 1, further comprising:
a frame configured to receive the battery cell assembly so as to wrap the battery cell assembly,
wherein the end plate is fixed to the frame.

6. A battery pack comprising the battery module according to claim 1.

7. The battery module according to claim 1, wherein a space between each of the plurality of projecting portions is equal to a width of each of the plurality of battery cells.

8. A battery module comprising:
a battery cell assembly constituted by stacking a plurality of battery cells;
an end plate disposed adjacent to one end of the battery cell assembly; and
a shock-absorbing member interposed between the one end of the battery cell assembly and the end plate,
wherein the shock-absorbing member is woven fabric or non-woven fabric formed of a plurality of fibers, and
wherein a protrusion protruding toward the plurality of battery cells is provided on a surface of the end plate facing the shock-absorbing member.

9. The battery module according to claim 8, wherein the protrusion is formed such that a width of the protrusion gradually decreases toward the plurality of battery cells.

10. A battery module comprising:
a battery cell assembly constituted by stacking a plurality of battery cells;
an end plate disposed adjacent to one end of the battery cell assembly; and
a shock-absorbing member interposed between the one end of the battery cell assembly and the end plate; and
at least one projecting portion on the shock-absorbing member extending toward the plurality of battery cells,
wherein the shock-absorbing member is woven fabric or non-woven fabric formed of a plurality of fibers,
wherein the plurality of battery cells are stacked in a first direction,
wherein the at least one projecting portion extends in a second direction perpendicular to the first direction, and
wherein the at least one projecting portion is aligned to be between two battery cells of the plurality of battery cells.

11. The battery module according to claim 10, wherein the at least one projecting portion is a plurality of projecting portions, wherein each of the plurality of projecting portions is aligned to be between battery cells of the plurality of battery cells, and wherein a space between each of the plurality of projecting portions is equal to a width of each of the plurality of battery cells.

12. A battery module comprising:

a battery cell assembly constituted by stacking a plurality of battery cells;

an end plate disposed adjacent to one end of the battery cell assembly; and a shock-absorbing member interposed between the one end of the battery cell assembly and the end plate; and at least one protrusion on the end plate extending toward the plurality of battery cells, wherein the shock-absorbing member is woven fabric or non-woven fabric formed of a plurality of fibers, wherein the plurality of battery cells are stacked in a first direction, wherein the at least one protrusion extends in a second direction perpendicular to the first direction, and wherein the at least one protrusion is aligned to be between two battery cells of the plurality of battery cells.

13. The battery module according to claim 12, wherein the at least one protrusion is a plurality of protrusions, wherein each of the plurality of protrusions is aligned to be between battery cells of the plurality of battery cells, and wherein a space between each of the plurality of protrusions is equal to a width of each of the plurality of battery cells.

* * * * *